(12) United States Patent
Kondoh et al.

(10) Patent No.: US 6,906,261 B2
(45) Date of Patent: Jun. 14, 2005

(54) WIRING SYSTEM FOR INTERCONNECTING VEHICLE-MOUNTED ELECTRONIC DEVICES THROUGH A WIRING HARNESS

(75) Inventors: Tatsuya Kondoh, Yokkaichi (JP); Motohiro Yokoi, Yokkaichi (JP); Katsunori Hattori, Yokkaichi (JP); Takeharu Ito, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 24 days.

(21) Appl. No.: 10/050,168

(22) Filed: Jan. 18, 2002

(65) Prior Publication Data

US 2002/0111048 A1 Aug. 15, 2002

(30) Foreign Application Priority Data

Jan. 22, 2001 (JP) ........................................ 2001-013853
Aug. 29, 2001 (JP) ........................................ 2001-259396

(51) Int. Cl.[7] .............................................. H02G 1/00
(52) U.S. Cl. ...................... 174/72 A; 174/72 R; 174/95; 174/69; 174/71 R; 174/2
(58) Field of Search ........................... 174/72 A, 72 R, 174/95, 69, 71 R; 361/826; 439/720, 722

(56) References Cited

U.S. PATENT DOCUMENTS

| | | | | |
|---|---|---|---|---|
| 3,627,903 A | * | 12/1971 | Plummer | ................... 174/72 A |
| 4,493,147 A | * | 1/1985 | Bakermans | ................... 29/861 |
| 4,942,499 A | * | 7/1990 | Shibata et al. | ............... 361/826 |
| 5,239,445 A | * | 8/1993 | Parks et al. | ................... 361/686 |
| 5,610,447 A | * | 3/1997 | Nishikawa et al. | ............ 307/38 |
| 5,817,976 A | * | 10/1998 | Yanase et al. | ............... 174/52.1 |
| 5,856,908 A | * | 1/1999 | Takiguchi et al. | ........... 361/690 |
| 5,888,103 A | * | 3/1999 | Norizuki et al. | ............. 439/701 |
| 6,470,567 B1 | * | 10/2002 | Shibayama et al. | ............ 29/825 |
| 6,494,722 B1 | * | 12/2002 | Sakamoto et al. | .......... 439/76.2 |

FOREIGN PATENT DOCUMENTS

| | | |
|---|---|---|
| JP | 10208566 | 8/1998 |
| JP | 10214526 | 8/1998 |
| JP | 2000-225902 | 8/2000 |

OTHER PUBLICATIONS

English Language Abstract of JP 10–214526.
English Language Abstract of JP 10–208566.
English Language Abstract of JP 2000–225902.

* cited by examiner

*Primary Examiner*—Dean A. Reichard
*Assistant Examiner*—Jinhee Lee
(74) *Attorney, Agent, or Firm*—Greenblum & Bernstein, P.L.C.

(57) ABSTRACT

A wiring system is provided where at least one device connector and at least one device connector are interconnected. The wiring system has at least one main harness with at least one group of wires aligned in a substantially parallel direction, and at least one sub harness with at least one group of wires forming at least one wire crossover. A coupling structure is further provided to couple the main and sub harnesses together to form a complete wiring harness that extends between the first and second device connectors. The wire crossover is provided only in the sub harness, so that the main harness is free of any wire crossovers.

3 Claims, 9 Drawing Sheets

Collective wire cutting and measuring

Terminal Crimping and Insertion

Terminal Crimping and Insertion

Wire measuring and cutting

Terminal crimping

Terminal insertion

Terminal insertion

US 6,906,261 B2

WIRING SYSTEM FOR INTERCONNECTING VEHICLE-MOUNTED ELECTRONIC DEVICES THROUGH A WIRING HARNESS

BACKGROUND OF THE INVENTION

1. Field of the Invention

The present invention relates to a wiring system for interconnecting vehicle-mounted electronic devices via a wiring harness and, in particular, to an improvement in the wiring system where a routing configuration of the wiring harness is simplified.

2. Description of Related Art

FIG. 5 shows a first example of a conventional wiring system that includes a vehicle-mounted device such as an electronic control unit (ECU) 1 for an electronic fuel injection (EFI) system. The ECU 1 has three ECU connectors A, B, C for connection to connectors a, b, c that are attached to leading ends W1, W2, W3 of an electric wire group W. However, wires of the electric wire group W, which are connected to the connectors a, b, c at one end, are configured to be dispersedly connected to different connectors e, f, g, h at the other end. In other words, wires that are equally connected to one connector at one end are dispersedly connected to different connectors at other ends. This is because an input signal is sent to the ECU through one wire, and an output signal is sent from the ECU through another wire.

As shown in FIG. 6, wires of an electric wire group W1 are connected to the connector a at one end, and are dispersedly connected to four different connectors e, f, g, h at other ends during subassembly. Wires of electric wire groups W2, W3 have the same configuration, except that they are not connected to the connectors e, f, g, h at the other end during subassembly.

More particularly, all the electric wire groups W1, W2, W3 are respectively connected to the connectors a, b, c at one end in advance during subassembly. However, only the electric wire group W1 is connected to the connectors e, f, g, h at other end during subassembly. The remaining electric wire groups W2, W3 are manually coupled to the connectors e, f, g, h subsequently, during final assembly. Arrows shown in FIG. 6 indicate terminals which are crimped at the other ends of the wires of the wire groups W2, W3 and which are mounted in the connectors e, f, g, h subsequently during final assembly. The wires are left hanging, and the terminals are left exposed until final assembly.

This presents the following problems, especially when the wires are long like the ones that are connected to the ECU 1 and that measure approximately 2000 mm–3000 mm.

When other ends of long wires are left scattered and hanging without being connected to connectors, the overall assembly is tedious and cumbersome to assemble, and exposed terminals at the other ends of the long wires are susceptible to damage. Also, it is difficult to insert the exposed terminals into a connector during final assembly because they are attached to the long wires.

Also, FIG. 7 (A) shows a second example of a conventional wiring system. A wiring harness W/H-1, produced by bundling a plurality of wires d, extends between devices K1, K2 to electrically connect them via connectors C1, C2 provided at opposite ends thereof. Connection terminals (not shown) are provided at connection areas K1a, K2a of the devices K1, K2. The respective connection terminals are independently and uniquely arranged so that the arrangement patterns of the connection terminals do not correspond to one another between the connection areas K1a, K2a. Thus, the wiring harness W/H-1 has wire crossovers, with the wires d intersecting with one another.

This makes the lengths of the wires d different. Thus, the wires d have to be measured and cut separately one by one, as shown in FIG. 7(B). After the wires d are measured and cut, terminals are attached to opposite ends of the wires d, and then inserted into predetermined cavities of the connectors C1, C2.

As described above, manufacturing the wiring harness W/H-1 as shown in FIG. 7(A) requires a very cumbersome and time-consuming process, which does not allow manufacturing costs to be reduced.

Additionally, FIG. 8 shows a third example of a conventional wiring system that includes a wiring harness W/H-2 produced by bundling a plurality of wires d. The wiring harness W/H-2 extends among devices K3, K4, K5 and switches SW1, SW2, and electrically connect them via connectors C3, C4, C5, C6, C7 provided at respective ends thereof. The devices K3, K4, K5 and switches SW1, SW2 share common circuits, so that joint connectors J1, J2 are provided to form joint portions S1, S2 in the wiring harness W/H-2.

Since these joint portions S1, S2 are required, an overall circuit configuration of the wiring harness W/H-2 is complicated and cumbersome. As a result, time-consuming, subsequent terminal insertion rate during final assembly increases, thereby decreasing efficiency in subassembly and thus deteriorating the merits of subassembly production. Further, it is difficult to introduce an automatic assembly machine that would improve assembly efficiency because of the cumbersome circuit configuration. Furthermore, as in the case of the wiring harness W/H-1 as shown in FIG. 7(A), the wires d of the wiring harness W/H-2 may intersect to form crossovers, depending on the requirements of connection terminals arranged at connection areas of the devices K3, K4, K5 and switches SW, SW2. This further complicates the problems of this wiring system.

SUMMARY OF THE INVENTION

The present invention has been developed after taking the above problems into consideration, and an object thereof is to provide a wiring system which ensures an easy connection between electronic devices through a wiring harness. Another object of the present invention is to simplify and make efficient the wiring harness manufacturing process itself.

The present invention provides a wiring system for interconnecting at least first and second device connectors of an electronic control unit and at least first and second external connectors associated with at least one electronic device. The electronic device is spaced apart from the electronic control unit. The first and second device connectors are constructed of a predetermined first terminal arrangement pattern, and the first and second external connectors are constructed of a predetermined second terminal arrangement pattern. The predetermined first and second terminal arrangement patterns do not correspond to each other.

The wiring system has at least first and second long, main harnesses. Each of the main harnesses has at least one electric wire terminated with an end terminal at one end thereof and a relay terminal at the other end thereof. The end terminal is inserted in an end connector, and the relay terminal is inserted in a relay connector. The end connectors of the first and second main harnesses are configured for connection to the first and second external connectors.

The wiring system further has at least first and second, short sub harnesses. Each of the sub harnesses has at least one electric wire terminated with an end terminal at one end thereof and a relay terminal at the other end thereof. The end terminal is inserted in an end connector, and the relay terminal is inserted in a relay connector. The end connectors of the first and second sub harnesses are configured for connection to the first and second device connectors. The relay connectors of the first and second sub harnesses are configured for connection to the relay connectors of the first and second main harnesses, so that at least first and second wiring harnesses are formed when the relay connectors of the first and second sub harnesses and the first and second main harnesses are coupled together.

The relay connectors of the first and second sub harnesses, the relay connectors of the first and second main harnesses and the end connectors of the first and second main harnesses are constructed of a predetermined terminal arrangement pattern that corresponds to the predetermined second terminal arrangement pattern of the first and second external connectors. Accordingly, the wire of the first main harness and the wire of the second main harness extend without intersecting with each other. Hence, the end and relay terminals of the first and second main harnesses can be mounted in the end and relay connectors of the first and second main harnesses respectively during subassembly, and thus the first and second main harnesses can be subassembled independently of each other.

The end connectors of the first and second sub harnesses are constructed of a predetermined terminal arrangement pattern which corresponds to the predetermined first terminal arrangement pattern of the first and second device connectors. The predetermined first terminal arrangement pattern does not correspond to the predetermined second terminal arrangement pattern of the first and second external connectors. Thus, the wire of the first sub harness and the wire of the second sub harness extend, intersecting with each other. Hence, the first and second sub harnesses cannot be assembled independently of each other during subassembly.

The above construction of the present invention is particularly effective for use in an automotive wiring system where a plurality of composite wiring harnesses are routed to a plurality of device connectors provided at an electronic control unit for an electronic fuel injection system. More particularly, the composite wiring harnesses extend from the electronic control unit to at least one connector of a junction box, at least one connector of a fuse box and/or at least one connector attached to other wiring harness(es) extending to other electronic device(s).

According to the above construction, only the end terminals (or the relay terminals) of the first and second sub harnesses can be inserted in their corresponding connectors during subassembly. The remaining relay terminals (or the end terminals) are inserted subsequently during final assembly, and are left hanging and exposed until final assembly.

However, the first and second long, main harnesses are left free of any subsequent terminal insertion operations. Thus, the wires of the first and second main harnesses can be automatically crimped to the end and relay terminals, then the end and relay terminals can be automatically mounted in the end and relay connectors.

Even though the subsequent terminal insertion operation is carried out on the first and second sub harnesses, these sub harnesses are very short in length. Consequently, the wires of these sub harnesses are unlikely to become entangled, and thus are easy to handle.

In a preferred form of the present invention, the first and second sub harnesses each constitute approximately 5% to 10% of a total length of the first and second wiring harnesses, respectively. More preferably, the first and second sub harnesses each constitute approximately 5% of the total length. Still more preferably, the wires of the first and second main harnesses each measure approximately 2000 mm–3000 mm and the wires of the first and second sub harnesses measure approximately 100 mm.

Further, the present invention provides a wiring system for interconnecting at least one device connector of at least one first electronic device and at least one second device connector of at least one second electronic device spaced apart from the first electronic device.

The wiring system has at least one main harness with at least one group of wires aligned in a substantially parallel direction, and at least one sub harness with at least one group of wires. The group of wires of the sub harness has at least one wire crossover formed therein. The wiring system further has a coupling structure configured to couple the main and sub harnesses together to form a complete wiring harness that extends to interconnect the first and second device connectors. The wire crossover is formed only in the sub harness, with the main harness free of any wire crossovers.

In accordance with the above construction, the wiring harness is divided in a plane perpendicular to an extending direction thereof, in order to form the sub harness and the main harness. The wire crossover is concentrated in the sub harness, so that the main harness is left free of any wire crossovers. Accordingly, the wires of the main harness can be measured and cut collectively at the same time, thereby reducing manufacturing time, as opposed to the conventional manufacturing method of measuring and cutting the wires of a wiring harness separately one by one.

In the event where one end of the main harness is attached to an insulation displacement type connector, the main harness can, for example, be manufactured by:

(a) measuring the wires collectively at the same time;
(b) mounting leading ends of the wires in pressure contact with a first end connector collectively at the same time, thereby providing the first end connector for connection to the first device connector at one end of the main harness;
(c) cutting the other ends of the wires collectively at the same time; and
(d) crimping the other ends of the wires to terminal fittings, and mounting the terminal fittings in a second end connector, thereby providing the second end connector for connection to an end connector of the sub harness at the other end of the main harness.

In this manner, the main harness can be manufactured efficiently. Thus, the wiring harness is preferably divided, such that the main harness occupies a major portion of a total length of the wiring harness, e.g., 90%–95% of the total length.

Even though the sub harness has the wire crossover, the sub harness is miniaturized, and thus the wires of the sub harness are very short in length. Therefore, the manufacturing of the sub harness (i.e., separate wire measuring and cutting operation and separate terminal crimping and insertion operation) is not so time-consuming, as compared to the case of the conventional wiring harness. As a result, the overall productivity can be improved significantly.

In another aspect of the present invention, the coupling structure has a main harness side connector and a sub harness side connector which are mutually engageable with each other. A plurality of electrical terminals are arranged in the main harness side and sub harness side connectors respectively in such a manner as:

(a) to correspond to an electrical terminal arrangement pattern of the first device connector, so that the wires of the main harness are aligned in a substantially parallel manner; and (b) not to correspond to an electrical terminal arrangement pattern of the second device connector, so that the wires of the sub harness are not aligned in a substantially parallel manner.

Preferably, the main harness has at least one end connector for connection to the first device connector, with a plurality of electrical terminals arranged in the end connector in such a manner as to correspond to the electrical terminal arrangement pattern of the first device connector.

Furthermore, the present invention provides a wiring system for interconnecting at least one device connector of at least one first electronic device and at least one second device connector of at least one second electronic device.

The wiring system has at least one main harness with at least one group of wires aligned in a substantially parallel direction, and at least one sub harness having at least one group of wires with at least one joint portion provided therein.

The wiring system further has a coupling structure configured to couple the main and sub harnesses together to form a complete wiring harness that extends to interconnect the first and second device connectors. The joint portion is provided only in the sub harness, with the main harness free of any joint portions.

In accordance with the above construction, the wiring harness is divided to form the sub harness with the joint portion concentrated therein and the main harness without any joint portions provided therein. Accordingly, the same advantages as described above can be achieved.

In a preferred form, the wires of the sub harness are also aligned in a substantially parallel direction.

Still further, the present invention provides a wiring system for interconnecting at least first and second device connectors provided in a first electronic device and at least first and second external connectors associated with at least one second electronic device spaced apart from the first electronic device.

The wiring system has at least first and second main harnesses each having at least one group of wires aligned in a substantially parallel direction, and at least first and second sub harnesses each having at least one group of wires.

The wiring system further has at least first and second coupling members configured to couple the first and second main harnesses and the first and second sub harnesses together respectively, to form at least first and second wiring harnesses that extend to interconnect the first and second device connectors and the first and second external connectors.

The wires of the first and second sub harnesses are configured to extend dispersedly between the first and second device connectors and the first and second coupling members, so that at least one wire crossover is formed, with at least one of the wires of the first sub harness intersecting with at least one of the wires of the second sub harness. As a result, the main harnesses are left free of any wire crossovers.

In a further aspect of the present invention, the first and second main harnesses are provided with first and second end connectors respectively. A predetermined terminal arrangement pattern of the first and second coupling members and the first and second end connectors corresponds to an electrical terminal arrangement pattern of the first and second external connectors, respectively. Hence, the wires of the first and main harness are aligned in a substantially parallel manner.

In another aspect of the present invention, a composite wire harness is provided that includes a main harness including only a plurality of first wires, with all of the first wires aligned substantially parallel with one another, a sub harness including a plurality of second wires, with at least one of the second wires being a crossover wire, and a connecting device configured to connect the main harness to the sub harness to form the composite wire harness.

The sub harness is substantially shorter than the main harness, and the sub harness may have a length of approximately 5% to 10% of the length of the composite wire harness. Also, the first wires may have a length of approximately 2000 mm to 3000 m, and the second wires have a length of approximately 100 mm.

In a further aspect of the present invention, the connecting device of the composite wire harness may include a main harness side connector and a sub harness side connector which are mutually engageable with each other, and a plurality of electrical terminals are arranged in the main harness side and sub harness side connectors respectively in such a manner as:

(a) to correspond to an electrical terminal arrangement pattern of a first device connector so that the first wires of the main harness remain aligned in a substantially parallel manner; and (b) not to correspond to an electrical terminal arrangement pattern of a second device connector so that the second wires of the sub harness are not aligned in a substantially parallel manner.

Additionally, the main harness may include at least one end connector for connection to the first device connector, and a plurality of electrical terminals are arranged in the end connector in such a manner as to correspond to the electrical terminal arrangement pattern of the first device connector.

BRIEF DESCRIPTION OF THE DRAWINGS

Other features of the invention will be apparent from the following description of preferred embodiments shown by way of example only in the accompanying drawings in which.

DETAILED DESCRIPTION OF THE PREFERRED EMBODIMENTS

The embodiments of the present invention will be described with reference to the drawings.

Figure 1:
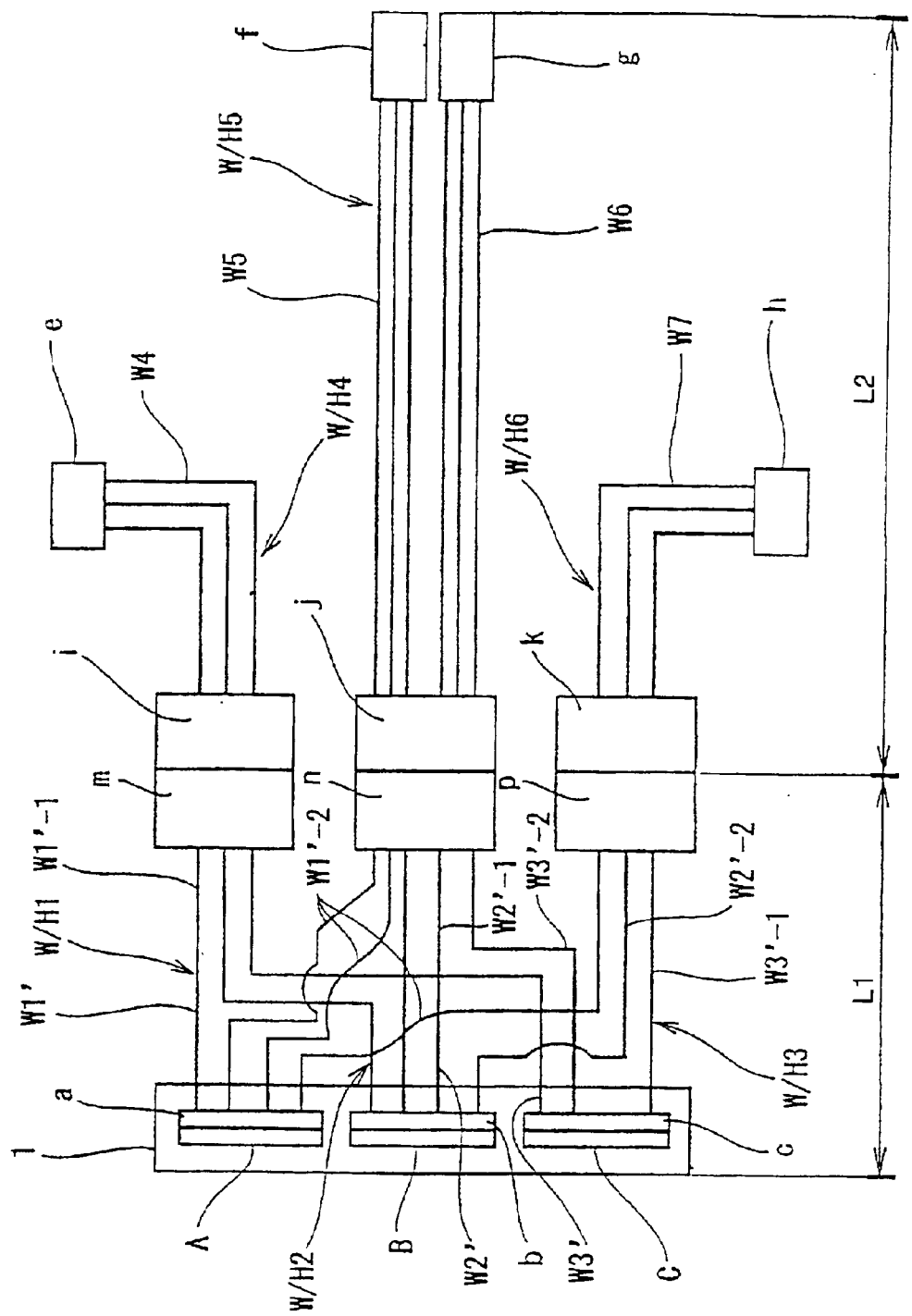
FIG. 1 is a schematic view illustrating a wiring system according to a first embodiment of the present invention.

FIG. 1 shows the first embodiment of the present invention. The first embodiment is particularly applicable in a wiring system where one or more wiring harnesses are connected to a plurality of connectors provided in a vehicle-mounted device such as the ECU 1 for the EFI system, as in the case shown in FIG. 5.

Main harnesses W/H4, W/H5, W/H6 are respectively sub-assembled by connecting connectors e, f, g, h to leading ends of electric wire groups W4, W5, W6, W7, and by connecting main connectors i, j, k to the other ends of the electric wire groups W4, W5, W6, W7.

The length of these electric wire groups W4, W5, W6, W7 is L1, where L1 is preferably approximately 2000 mm–3000 mm, which is about 95% of a predetermined total length from ECU connectors A, B, C provided in the ECU 1 to the connectors e, f, g, h provided at the leading ends of the main harness W/H4, W/H5, W/H6.

The main (long) harnesses W/H4, W/H5, W/H6 have a length corresponding to L1 and are configured so that all the electric wire groups W4, W5, W6, W7 can be terminated to the connectors e, f, g, h, i, j, k at opposite ends thereof during subassembly. Thus, automatic termination of the ends of the electric wire groups W4, W5, W6, W7 is possible.

Sub (short) harnesses W/H1, W/H2, W/H3 extend between the main connectors i, j, k and the ECU connectors A, B, C. The length of these sub harnesses W/H1, W/H2, W/H3 is L2 where L2 is preferably approximately 100 mm, which is about 5% of the total length. Of course, L1 and L2 may have any suitable dimension where L1 remains greater than L2. However, it is preferred that L1 constitute 90% to 95% of the total length, with L2 constituting the remaining 5% to 10%.

Figure 5:
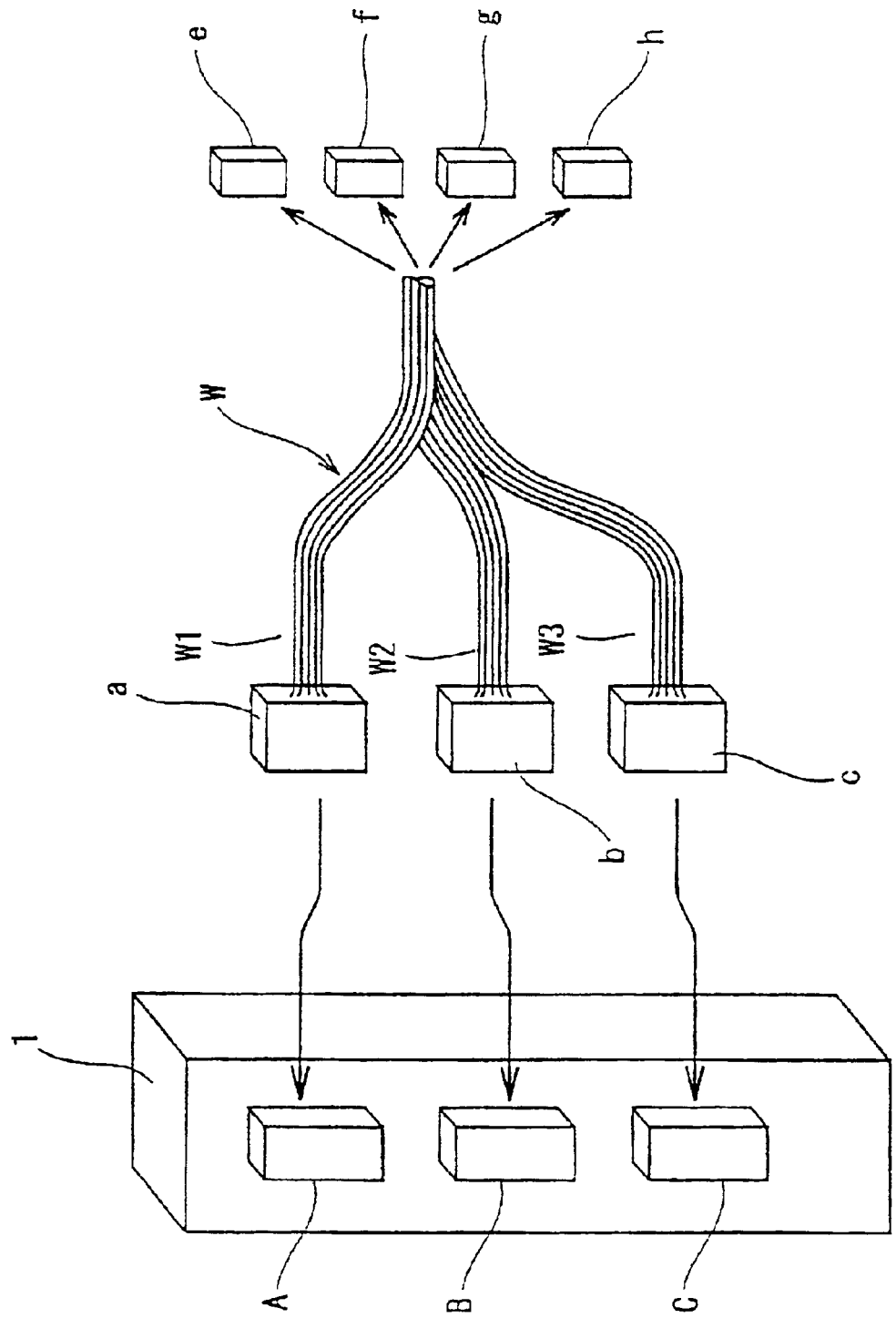
FIG. 5 is a schematic view of the first example of a conventional wiring system.
Figure 6:
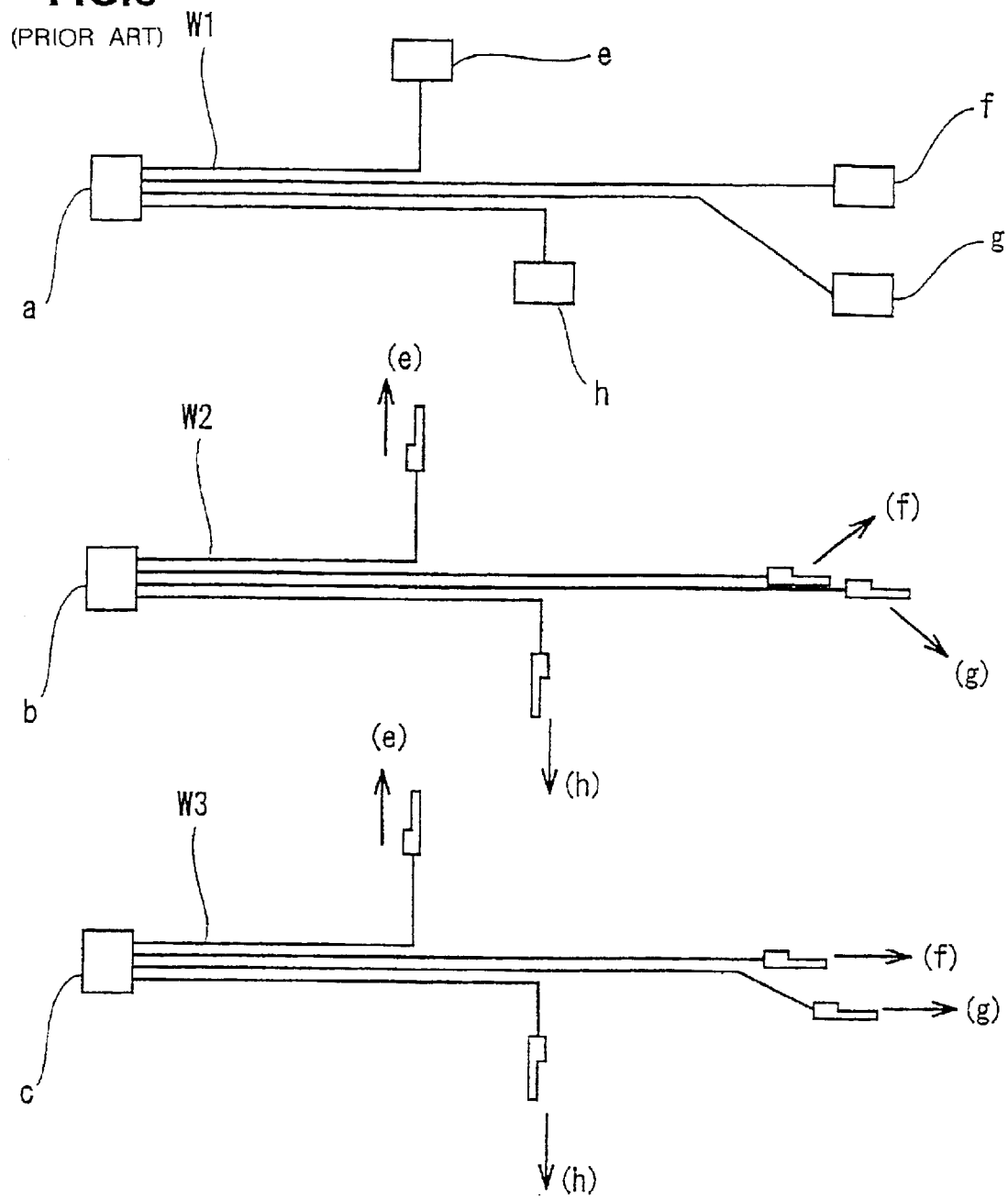
FIG. 6 is a view illustrating how a conventional wiring harness according to the first example is assembled from subassemblies.

Connectors a, b, c for connection to the ECU connectors A, B, C are provided at ends of electric wire groups W1', W2', W3' of the sub harnesses W/H1, W/H2, W/H3, as in the case in FIG. 5.

In the electric wire group W1' of the sub-harnesses W/H1, a terminal terminated to the other end of a wire W1'-1 is fitted in a sub-connector m during subassembly, while terminals terminated to the other ends of the remaining wires W1'-2 are fitted in sub-connectors n, p subsequently. Likewise, in the electric wire group W2' of the sub harnesses W/H2, a terminal terminated to the other end of a wire W2'-1 is fitted in the sub-connector n during subassembly, while terminals terminated to the other ends of the remaining wires W2'-2 are fitted in the sub-connectors m, p subsequently. Similarly, in the electric wire group W3' of the sub harnesses W/H3, a terminal terminated to the other end of a wire W3'-1 is fitted in the sub-connector p during subassembly, while terminals terminated to the other ends of the remaining wires W3'-2 are fitted in the connectors m, n subsequently.

In this manner, all the subsequent terminal insertion operations are carried out only on the sub-harnesses W/H1, W/H2, W/H3. Accordingly, all the electric wire groups W4, W5, W6, W7 of the main harnesses W/H4, W/H5, W/H 6 can be terminated to the connectors e, f, g, h, i, j, k at opposite ends thereof during subassembly.

The main harness W/H4 is connected to a fuse block (not shown), and the main harness W/H5 is connected to a junction block (not shown). The main harness W/H6 is connected to an output-side wiring harness (not shown).

As described above, the wiring harnesses W/H1; W/H3, W/H2; W/H5, W/H4; W/H6 are respectively divided in a plane perpendicular to an extending direction thereof to form the long main harnesses W/H4, W/H5, W/H6 and the short sub-harnesses W/H1, W/H2, W/H3. The long main harnesses W/H4, W/H5, W/H6 can be completely terminated to the connectors e, f, g h, i, j, k at opposite ends thereof during subassembly, and thus can be formed into complete subassemblies. Hence, the electric wire groups W4, W5, W6, W7 of the main harnesses W/H4, W/H5, W/H6 can be automatically connected to the connectors e, f, g, h, i, j, k.

Also, since all the subsequent terminal insertion operations are carried out on the sub-harnesses W/H1, W/H2, W/H3 that are short in length, the operations are easy to carry out, and the wires W1'-2, W2'-2, W'3-2 are unlikely to become scattered and entangled during final assembly. In addition, the sub-harnesses W/H1, W/H2, W/H3 that are connected to the ECU 1 can be of standard configuration and can be commonly applicable to those for use in different types of vehicles, while the main harnesses W/H4, W/H5, W/H6, which may vary in configuration according to different types of vehicles, can be sub-assembled completely. Thus, the overall wiring harness productivity is significantly improved.

Figure 2A:
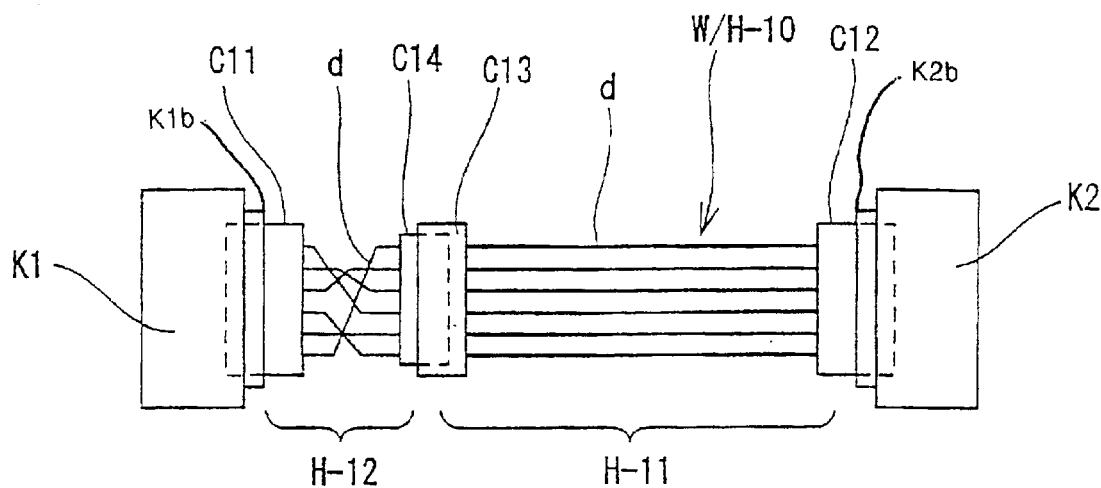
FIG. 2(A) is a schematic view illustrating a wiring system according to a second embodiment of the present invention.
Figure 2B:
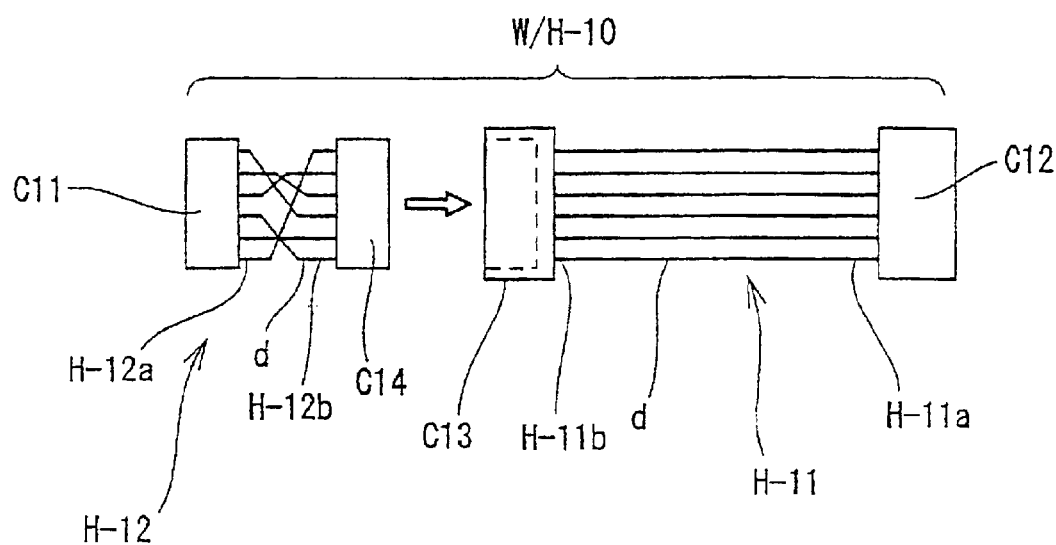
FIG. 2(B) is an exploded view of a wiring harness according to the second embodiment of the present invention.
Figure 7A:
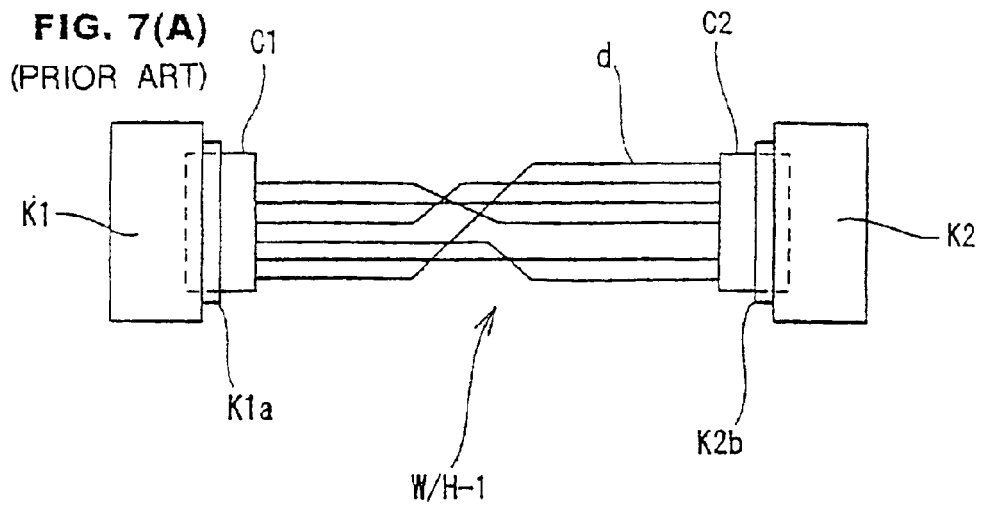
FIG. 7(A) is a schematic view illustrating the second example of a conventional wiring system.

FIGS. 2(A) and (B) show the second embodiment of the present invention in which devices K1, K2 are connected via a wiring harness W/H-10, as in the case in FIG. 7(A). The wiring harness W/H-10 is divided in a plane perpendicular to an extending direction thereof to form a main harness H-11 and a sub harness H-12. The main harness H-11 occupies the majority of the length of the wiring harness W/H-10, while the sub harness H-12 occupies the remaining minority of the length. Since the terminal arrangement patterns of connection terminals (not shown) provided at connection areas K1a, K2a of the devices K1, K2 do not correspond to one another, it is necessary to extend wires d between the devices K1, K2, while forming crossovers, with the wires d intersecting with one another. However, the crossovers are provided only at the sub-harness H-12, so that the main harness H-11 is left free of any crossovers. Thus, the wires d constituting the main harness H-11 are aligned in a substantially parallel direction.

The main harness H-11 has a connector C12 for connection to the device K2 at one end H-11a thereof and a connector C13 for connection to the sub harness H-12 at the other end H-11b thereof. Also, the sub harness H-12 has a connector C11 for connection to the device K1 at one end H-12a thereof and a connector C14 for connection to the main harness H-11 at the other end H-12b thereof.

Figure 3A:
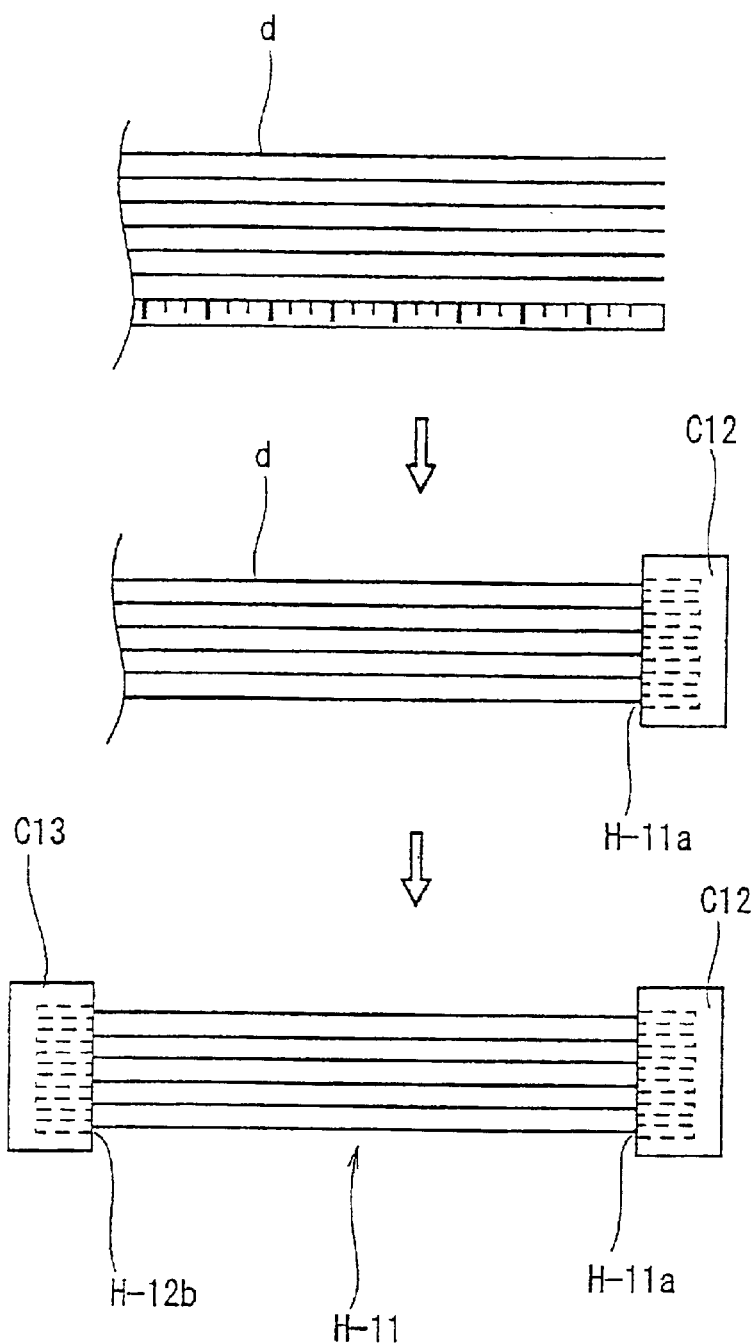
FIG. 3(A) is a schematic view illustrating a manufacturing process of a main harness of the wiring harness according to the second embodiment of the present invention.

FIG. 3(A) shows a manufacturing process of the main harness H-11. The wires d of the main harness H-11 have the same length in the absence of the crossovers. Thus, all the wires d are measured and cut collectively at the same time. Thereafter, terminals are crimped to both ends of the wires d, and inserted into the connectors C12, C13. In this way, production of the main harness H-11 is very efficient, and is less time-consuming and cumbersome.

Figure 3B:
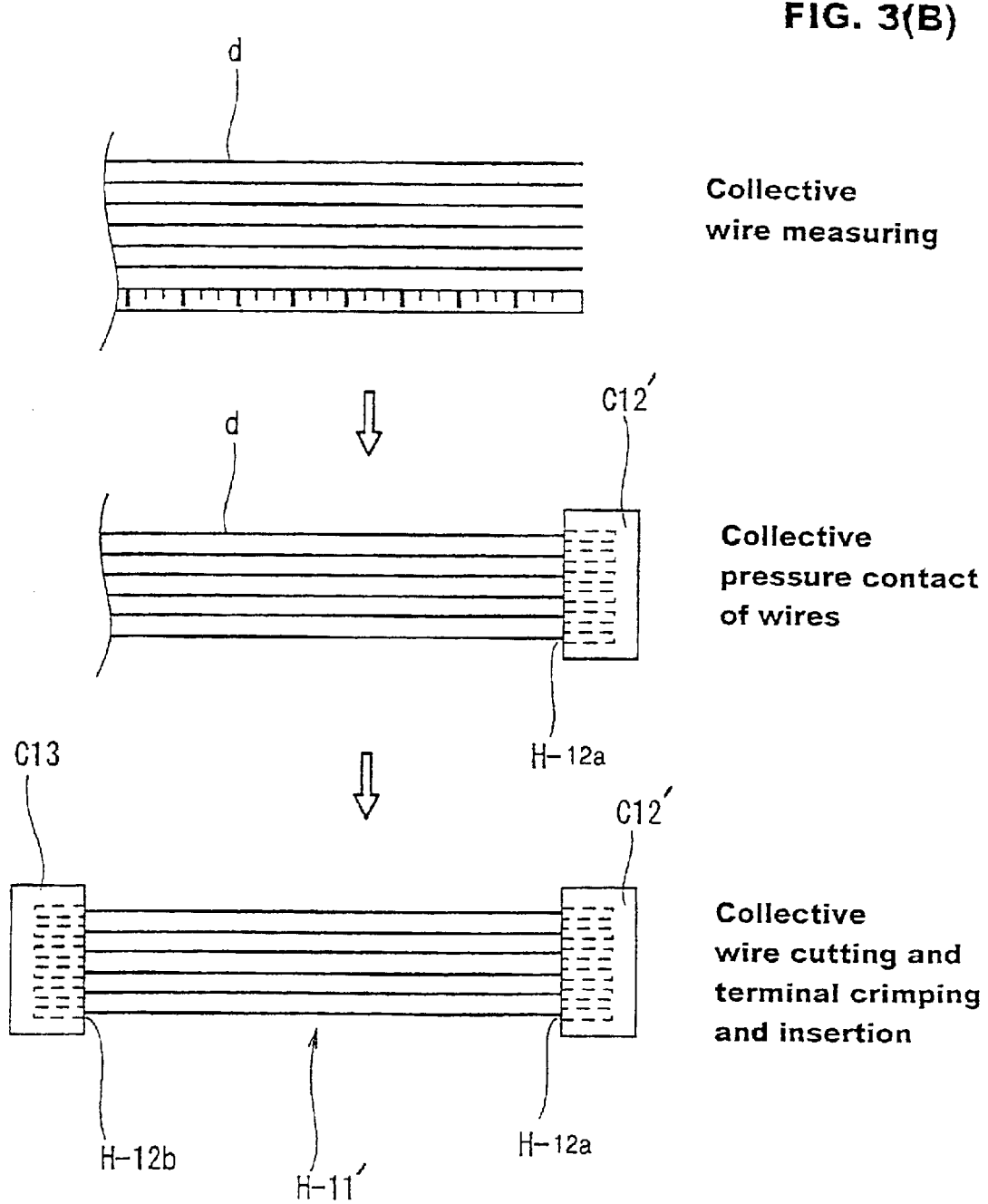
FIG. 3(B) is a schematic view illustrating a variation of the manufacturing process of the main harness according to the second embodiment of the present invention FIG. 4 (A) is a schematic view illustrating a wiring system according to a third embodiment of the present invention.

FIG. 3(B) shows a manufacturing process of a variation of the main harness H-11 which includes an insulation displacement type connector C12'. The wires d of a main harness H-11' have the same length in the absence of the crossovers. Thus, all the wires d are measured collectively at the same time, and the ends H-12a of all the wires d are mounted in pressure contact with the insulation displacement type connector C12' collectively at the same time. Subsequently, the other ends H-12b are cut collectively at the same time, and crimped to terminal fittings. Then, the terminal fittings are mounted in the connector C13. In this way, production of the main harness H-11' is very efficient, and is less time-consuming and cumbersome. Thus, an automatic assembling machine can be introduced to various production processes to improve the overall productivity.

Figure 7B:
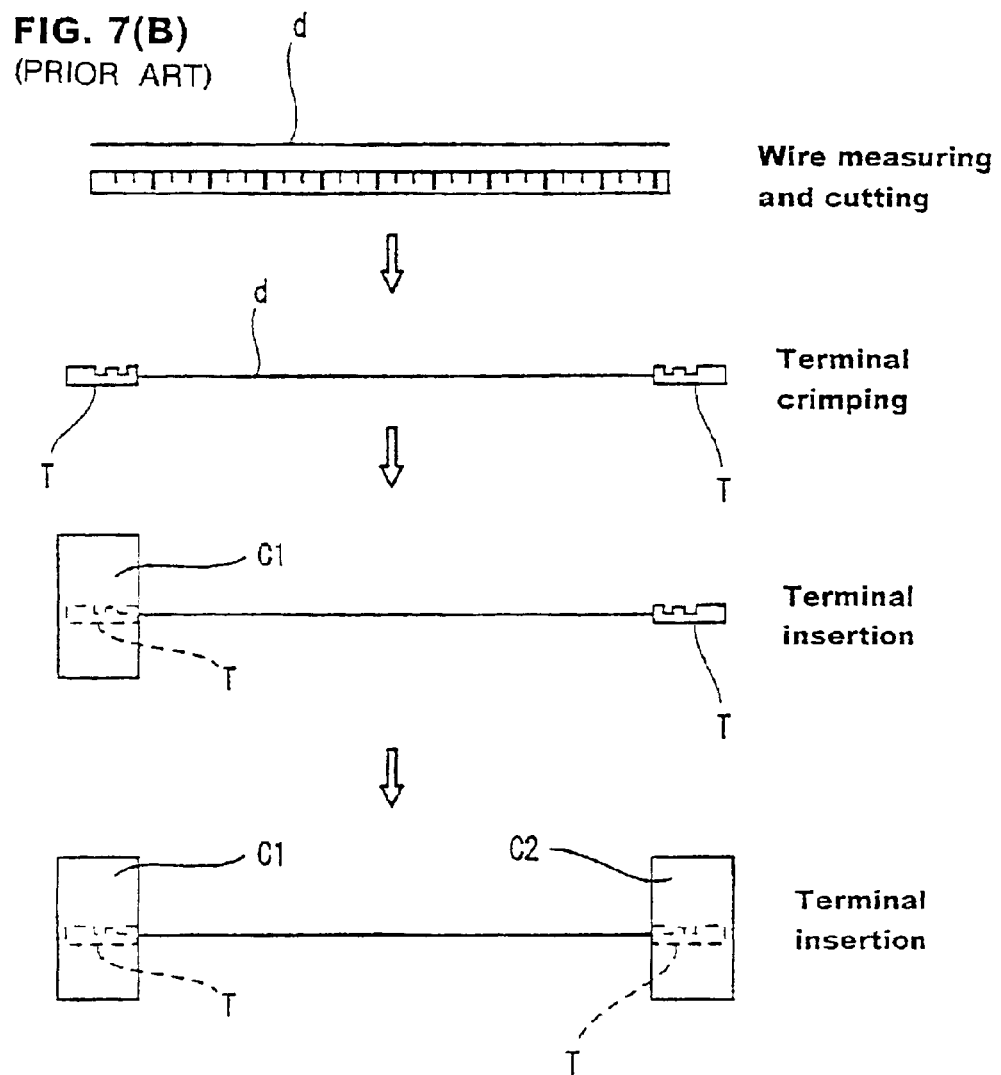
FIG. 7(B) is a view how a conventional wiring harness according to the second example is manufactured.

The manufacturing process of the sub harness H-12 is similar to that of the conventional wiring harness W/H-1 as shown in FIG. 7(B). However, the sub harness H-12 itself is short in length in an axial direction, and thus is miniaturized. Therefore, burdens of measuring and cutting wires separately one by one; crimping terminal fittings to the wires; and inserting the terminal fittings in the connectors are significantly reduced. Thus, manufacturing time is reduced significantly, as compared to the conventional construction.

According to the second embodiment of the present invention, although it is necessary to manufacture both the main harness H-11 and the sub harness H-12, each of them can be manufactured efficiently. Thus, a total manufacturing time of the main and sub harnesses H-11, H-12 is shorter than that of the wiring harness W/H-1.

The main and sub harnesses H-11, H-12 thus constructed are connected via the connectors C13, C14, thereby completing the wiring harness W/H-10. The wiring harness W/H-10 is connected to the devices K1, K2 via the connectors C11, C12 to electrically interconnect the devices K1, K2.

In the second embodiment, a wiring harness is configured to interconnect two devices. However, it is equally applicable in the case where the wiring harness extends to connect more than two devices. Also, in the event that the terminal arrangement pattern provided at a connection area of one device does not match that of another device considerably, a wiring harness can be divided at a plurality of locations to form a plurality of sub harnesses and main harnesses.

Figure 4A:
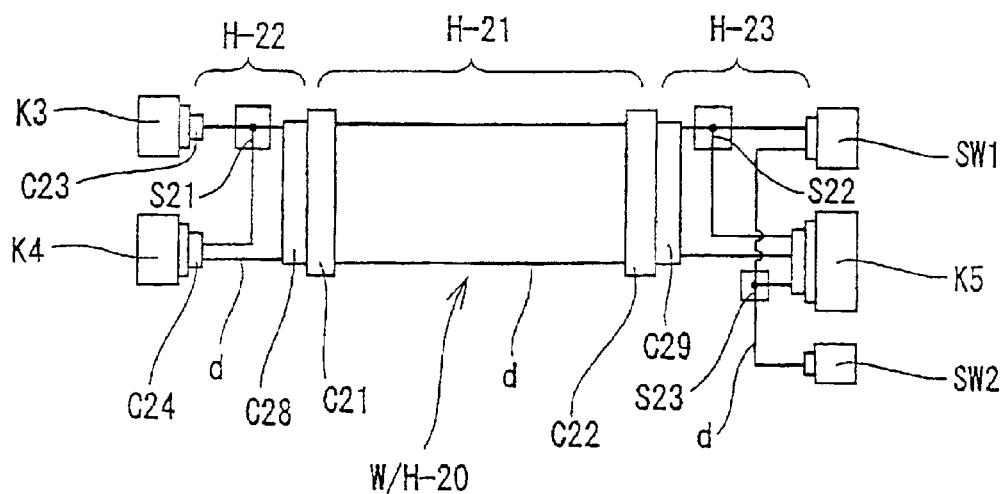
FIG. 4(B) is an exploded view of a wiring harness according to the third embodiment of the present invention.
Figure 4B:
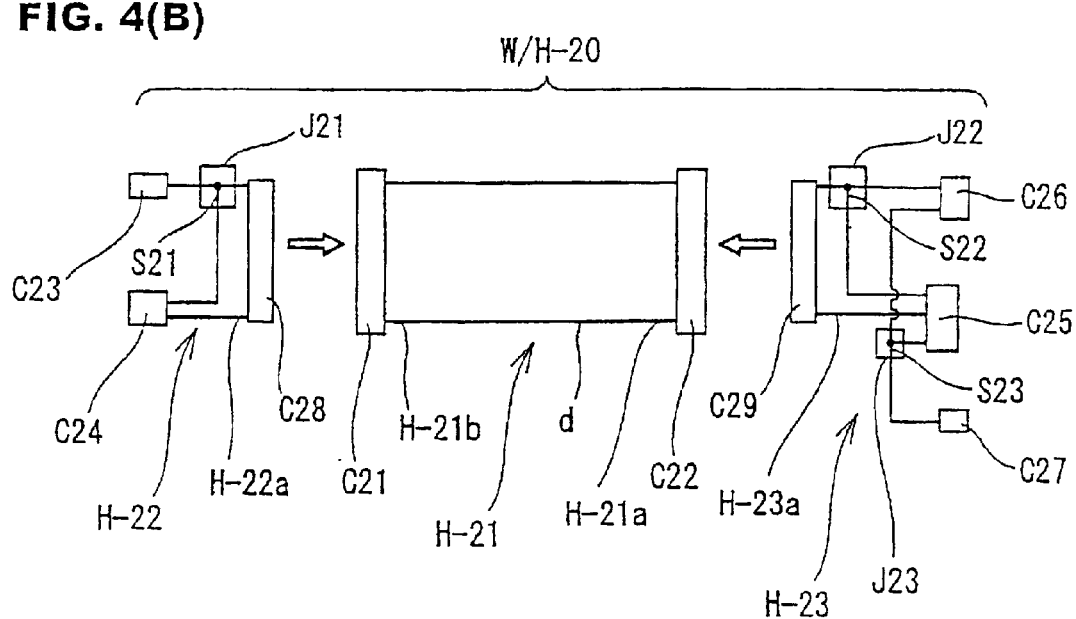

FIGS. 4(A) and (B) show the third embodiment of the present invention. A wiring harness W/H-20 produced by bundling a plurality of wires d is provided to connect a plurality of devices K3, K4, K5 and switches SW1, SW2, as in the case shown in FIG. 8. The wiring harness W/H-20 is divided at two places to form a main harness H-21, a first sub harness H-22 and a second sub harness H-23.

Since the devices K3, K4, K5 and switches SW1, SW2 share common circuits, it is necessary to form joint portions S21, S22, S23 in the wiring harness W/H-20. However, the joint portion S21 is formed in the first sub harness H-22, and the joint portions S22, S23 are formed in the second sub harness H-23, so that the main harness H-21 is left free of any joint portions, thereby aligning the wires d thereof in a substantially parallel direction. In addition, the wiring harness W/H-20 is divided so that the main harness H-21 occupies a major portion of the wiring harness W/H-20 and the sub harnesses H-22, H-23 occupy a minor portion.

The main harness H-21 has connectors C21, C22 at opposite ends H21a, H-21b thereof. The first sub harness H-22 has a connector C28 which mates with the connector C21 at one end H-22a thereof, and connectors C23, C24 for connection to the devices K3, K4 at the other ends thereof. Further, the second sub harness H-23 has a connector C29 which mates with the connector C22 at one end H-23a thereof, and connectors C25, C26, C27 for connection to the device K and the switches SW1, SW2 at the other ends thereof.

The main harness H-21 is manufactured efficiently in a similar manner as the main harness H-1 of the second embodiment, i.e., by measuring and cutting the wires d collectively at the same time and aligning the wires d in a substantially parallel direction, without any joint portions formed thereon, thereby eliminating the cumbersome manufacturing process. Of course, an automatic assembling machine may be used to manufacture the main harness H-21.

Figure 8:
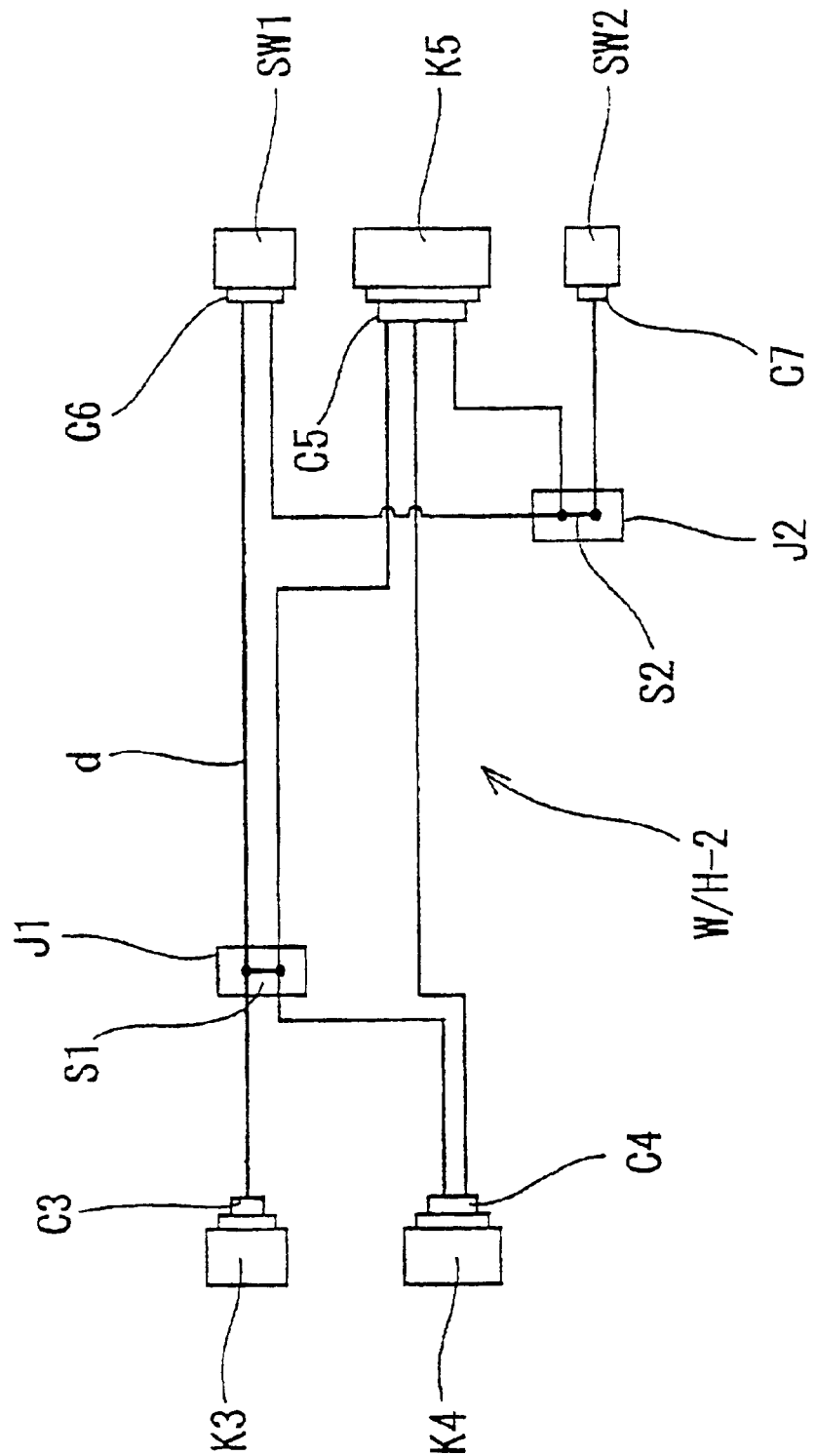
FIG. 8 is a schematic view illustrating the third example of a conventional wiring system.

The first and second sub harnesses H-22, H-23 are also manufactured in a similar manner as the conventional wiring harness W/H-2 as shown in FIG. 8. However, the sub harnesses H-22, H-23 form complete subassemblies as single members, which allows an early stage terminal insertion rate during subassembly and wire-laying operation efficiency (or subassembly efficiency) to increase, thereby improving productivity. Also, since the length of each wire is considerably shorter than that used in the wiring harness W/H-2, it is very easy to measure and cut wires, crimp terminal fittings to the wires, then mount the terminals in a connector housing, thereby reducing manufacturing time. The joint portions S21, S22, S23 are constructed of joint connectors J21, J22, J23 in the same manner as the conventional joint portions shown in FIG. 8. The number of joint portions increases by one, as compared to the conventional embodiment shown in FIG. 8. However, since the increased joint portion S23 is absorbed in the miniaturized, second sub harness H-23, the overall productivity does not deteriorate.

Even though the wiring harness W/H-20 is composed of a total of three harness, i.e.; the main harness H-21 and the first and second sub harnesses H-22, H-23, assembly inefficiency for each harness is significantly reduced, thereby making the total manufacturing time to manufacture these three harnesses less than it takes to manufacture the conventional wiring harness W/H-2 shown in FIG. 8.

An assembly of the wiring harness W/H-20 is completed when the connector C21 provided at one end of the main harness H-21 is coupled to the connector 28 of the first sub harness H-22, and the connector C22 provided at the other end of the main harness H-21 is coupled to the connector C29 of the second sub harness H-23. The wiring harness W/H-20 thus completed is connected to the devices K3, K4, K5 and the switched SW1, SW2 via the connectors C23, C24, 25, C26, C27 to form a predetermined electrical circuit.

A wiring harness according to the third embodiment is applicable in both of the cases where it extends from one device to another device and where it extends from one device to a plurality of devices. Also, A wiring harness according to the third embodiment is configured to absorb crossovers in sub harnesses, so that wires of a main harness are aligned in a substantially parallel direction. Additionally, its scope should not be limited to dividing a wiring harness at two locations; the wiring harness may be divided at one location or at more than one location according to required circuit configurations.

Further, it is preferable that a wiring harness according to the third embodiment be introduced, in particular, to a module such as an instrument panel module that connects devices in and/ or around an instrument panel. For example, a main harness can be connected to an instrument panel trunk harness, and sub harnesses can be connected to an accessory module and a switch module, respectively.

As is clear from the above description of the preferred embodiments, one or more wiring harnesses are divided in a plane perpendicular to an extending direction thereof, in order to form one or more long main harnesses and one or more short sub harnesses. The main harnesses are configured so that they can be completely sub-assembled during subassembly, free of any subsequent terminal insertion operations. Thus, it is possible to automatically terminate electric wire groups of the main harnesses to connectors, thereby improving productivity.

The subsequent terminal insertion operations are carried out only on the sub harnesses that are very short in length. As a result, the wires of the sub harnesses are unlikely to become scattered and entangled during subassembly, and thus are easy to handle. Further, it is advantageous in that such a short and thereby productive sub harnesses can be commonly shared among different types of vehicles as device connection harnesses.

Further, a wiring harness that includes wire crossovers is divided to form a main harness for aligning wires in a substantially parallel direction and at least one sub harness for absorbing the crossovers. Thus, manufacturing time and effort can be reduced, thereby improving productivity significantly. In addition, a wiring harness that includes joint portions is divided to form a main harness for aligning wires in a substantially parallel direction and a sub harness for absorbing the joint portions. Thus, manufacturing efficiency can be improved, and an overall wiring harness configuration can be simplified by concentrating cumbersome portions such as the joint portions in the sub harness.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein. Rather, the present invention extends to all functionally equivalent structures, methods and uses, such as are within the scope of the appended claims.

The present disclosure relates to subject matter contained in priority Japanese Applications No. Tokugan 2001-013853, filed on Jan. 22, 2001 and No. 2001-259396, filed on Aug. 29, 2001 which are herein expressly incorporated by reference in its entirety.

What is claimed is:

1. A wiring system for interconnecting at least first and second device connectors of an electronic control unit and at least first and second external connectors associated with at least one electronic device spaced apart from the electronic control unit, the first and second device connectors having a predetermined first terminal arrangement pattern, the first and second external connectors having a predetermined second terminal arrangement pattern which does not correspond to the predetermined first terminal arrangement pattern, the wiring system comprising:

at least first and second long, main harnesses each having at least one wire terminated with an end terminal at one end thereof and with a relay terminal at the other end thereof, the end terminal being inserted in an end connector and the relay terminal being inserted in a relay connector, the end connectors of the first and second main harnesses being configured for connection to the first and second external connectors;

at least first and second, short sub harnesses each having at least one wire terminated with an end terminal at one end thereof and with a relay terminal at the other end thereof, the end terminal being inserted in an end connector and the relay terminal being inserted in a relay connector, the end connectors of the first and second sub harnesses being configured for connection to the first and second device connectors, the relay connectors of the first and second sub harnesses being configured for connection to the relay connectors of the first and second main harnesses, so that at least first and second wiring harnesses are formed when the relay connectors of the first and second sub harnesses and the relay connectors of the first and second main harnesses are coupled together;

wherein the relay connectors of the first and second sub harnesses, the relay connectors and the end connectors of the first and second main harnesses include a predetermined terminal arrangement pattern that is configured to correspond to the predetermined second terminal arrangement pattern of the first and second external connectors, so that the wire of the first main harness and the wire of the second main harness extend without intersecting with each other, whereby the end and relay terminals of the first and second main harnesses can be mounted in the end and relay connectors of the first and second main harnesses respectively during subassembly, and whereby the first and second main harnesses can be sub-assembled independently of each other; and wherein the end connectors of the first and second sub harnesses include a predetermined terminal arrangement pattern that is configured to correspond to the predetermined first terminal arrangement pattern of the first and second device connectors which does not correspond to the predetermined second terminal arrangement pattern of the first and second external connectors, so that the wire of the first sub harness and the wire of the second sub harness extend, intersecting with each other, whereby the first and second sub harnesses cannot be sub-assembled independently of each other.

2. The wiring system of claim 1, wherein the first and second sub harnesses each constitute approximately 5% to 10% of a total length of the first and second wiring harnesses, respectively.

3. The wiring system of claim 2, wherein the wires of the first and second main harnesses measure approximately 2000 mm–3000 mm and the wires of the first and second sub harnesses measure approximately 100 mm.

* * * * *